United States Patent [19]

Heth

[11] 3,721,074

[45] March 20, 1973

[54] MOWER FOR MOWING AROUND AN OBJECT

[75] Inventor: Sherman C. Heth, Sturtevant, Wis.

[73] Assignee: Jacobsen Manufacturing Company, Racine, Wis.

[22] Filed: Feb. 16, 1972

[21] Appl. No.: 226,761

[52] U.S. Cl. ..................................................56/10.4
[51] Int. Cl. ..............................................A01d 35/26
[58] Field of Search...............56/10.4, DIG. 15, 13.6

[56] References Cited

UNITED STATES PATENTS 3,261,150   7/1966   Fitzgerald, Sr. ........................56/10.4

*Primary Examiner*—Louis G. Mancene
*Assistant Examiner*—J. A. Oliff
*Attorney*—Arthur J. Hansmann

[57] ABSTRACT

A mower for mowing around an object such as a tree or post, and including a mobile support having a first arm pivoted thereon and extending laterally therefrom, and a second arm pivoted on the extending end of the first arm and extending laterally and forwardly of the first arm. A cutter is supported on the extending end of the second arm and is positionable on the far side of a tree or post or the like when the support is moved forward, and the cutter, by virtue of the articulation in the first and second arms, is movable in a circle around the post or tree or the like as the mobile support advances past the object. Springs or like means are used to urge the two arms in their forward positions and against limit stops, and the cutter has a drive means and a power connection extending thereto for powering the cutter.

5 Claims, 2 Drawing Figures

MOWER FOR MOWING AROUND AN OBJECT

This invention relates to a mower for mowing around an object such a tree or post.

BACKGROUND OF THE INVENTION

Mowers for mowing around trees or posts or the like are already known, and they exist in different forms and constructions, such as those shown in U.S. Pat. Nos. 2,838,901 and 3,397,521 and 3,526,083. In those prior art constructions, there is an arm which extends laterally from a supporting tractor or the like, and the arm is commonly pivoted to the tractor and supports a cutter on the extending end of the arm. However, these prior constructions and/or showings are complex and bulky, and they do not adequately solve the problem of mowing in a complete circle around a tree or post or other object. Further, these prior art showings include multiple cutter heads or multiple cutters, in order to achieve some degree of mowing around an object. Still further, these prior art structures are all arranged such that they must engage the object on a specific part of the structure, whether that be in its extending arm or the cutter head itself, and this of course requires a careful steering or directing of the unit in order to have it achieve its function.

Accordingly, it is an object of the present invention to improve upon the mowers of the type heretofore known, and the improvement includes the features of providing a simplified and relatively light weight but highly efficient cutter and its supporting structure. In accomplishing this object, the cutter of the present invention can be of a nature which requires and therefore utilizes only a single cutter blade or cutter unit, rather than multiple blades with a complex cutter head supporting the blades.

Still another object of the present invention is to provide a mower of the type aforesaid and to have the mower arranged so that it will efficiently operate to mow in a circle around the post or a tree or the like without requiring that it be specifically or carefully steered into a position relative to the object. That is, the mower of this invention will function to mow in a circle around the object regardless of the very careful or specific steering of the mower relative to the object.

Still further, it is an object of this invention to provide a mower of the type aforesaid and which will have protection means to avoid damage to the object and to the mower.

All of the aforementioned objects are accomplished with a mower construction which is practical and therefore susceptible to being manufactured, sold, and used, since the aforementioned objects are accomplished with a simplified, inexpensive, lightweight, and efficiently operating apparatus.

Other objects and advantages will become apparent upon reading the following description in light of the accompanying drawings.

DETAILED DESCRIPTION OF THE PREFERRED EMBODIMENT

Figure 1:
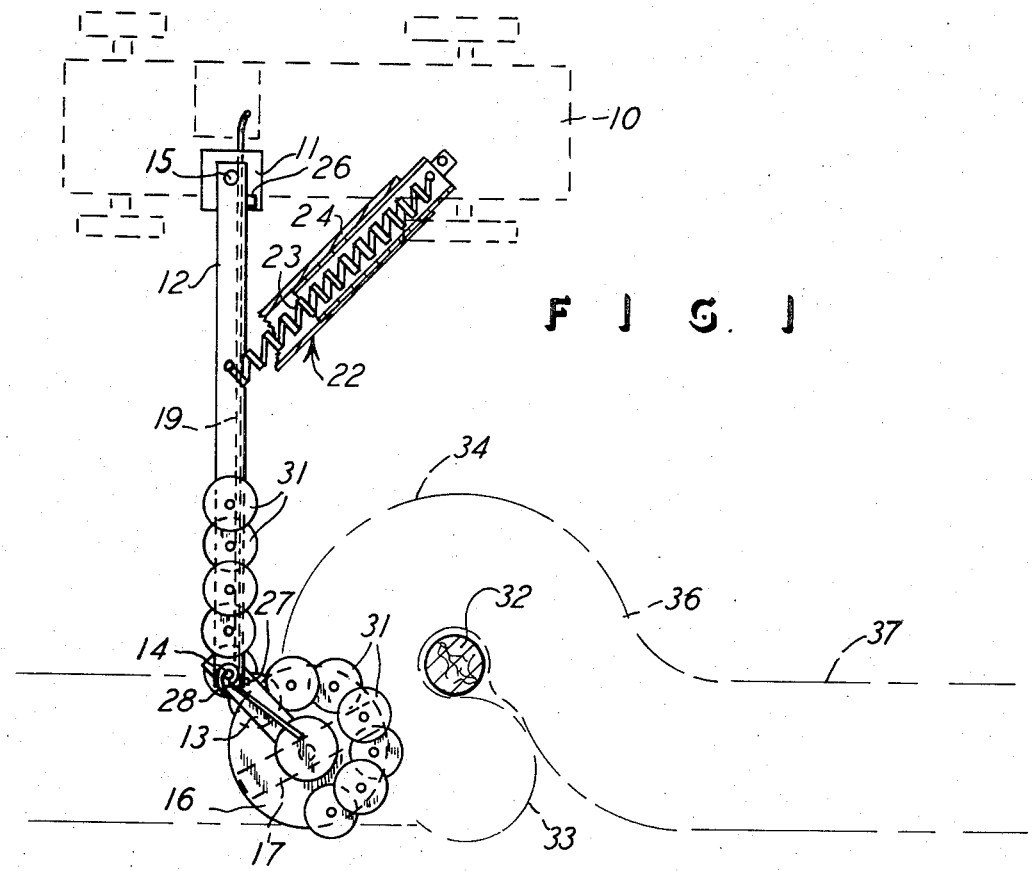
FIG. 1 is a top plan view of a preferred embodiment of this invention.

A mobile support, such as a tractor 10, is shown in dotted lines in FIG. 1 and it includes a supporting member 11 which pivotally supports a first arm 12 on a pivot post 15 on the tractor 10. The arm 12 extends laterally of the forward direction of movement of the tractor 10, and such direction would be to the right as viewed in FIG. 1. The first arm 12 pivotally supports a second arm 13 on the extending end of the arm 12 and by means of a pivot pin 14 which is common to both the arms 12 and 13 so that the arm 13 can pivot relative to the arm 12. The arm 13 is shown to extend laterally and forwardly of the arm 12, relative to the forward direction of the tractor 10, and it is also shown to be at a 45 degree angle relative to the longitudinal axis of the arm 12. A cutter unit 16 is supported on the extending end of the arm 13, and it includes a cutting blade 17 which is rotatable in the unit 16. A motor or the like 18 is mounted on the cutter 16 for powering the blade 17 in the cutting action, and power connecting lines 19 extend from the tractor 10 to the motor 18, and the motor 18 may be a hydraulic motor or it may be a gasoline motor. The cutter unit 16 also includes a housing 21, and it will now be understood that the cutter unit 16 is in the nature of a rotary mower unit.

Figure 2:
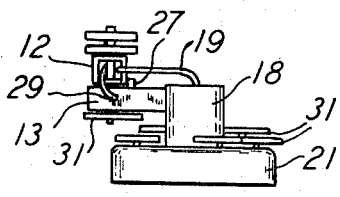
FIG. 2 is a side elevational view of the mower shown in FIG. 1.

The drawings further show that there is an accumulator or like energy storing mechanism 22 which is connected between the tractor 10 and the first arm 12. Specifically, as seen in FIG. 1, the accumulator 22 is there shown to be in the form of a tension spring 23 disposed within a protective sleeve 24, and the spring 23 permits the arm 12 to pivot about its pivot post 15 and in the direction rearwardly of the tractor 10, and the spring or accumulator 22 returns the arm 12 to the position shown in FIG. 1. A stop 26 is on the tractor 10 and serves as an abutment to the arm 12 to limit the forward pivoting motion of the arm 12, and that limit position is the one shown in FIG. 1. Likewise, a stop 27 is on the arm 13 and it pivots with the arm 13 to engage the side of the arm 12 and thus limit the forward pivot of the arm 13, and such position is as shown in FIG. 1. Also, an accumulator, again in the form of a spring, is shown in the spring 28 which is anchored to the pivot pin 14 and which engages the side of the arm 13 in the spring end 29 as shown in FIG. 2, and thus the arm 13 is urged to its limit position shown in FIG. 1.

The cutter unit 16 and the extending end of the arm 12 are shown to have bumpers 31 thereon, and these bumpers are shown to be in the form of rotatable discs and they are in advance of the cutter unit 16 and the arm 12 so that they can engage any object encountered in the forward movement of the entire machine. Thus, as the tractor 10 moves forwardly into alignment with the tree or post indicated at 32, the cutter unit 16 will assume the position shown by the dot-dash lines at the location designated 33, and at that point the mower will be on the far side of the object 32, relative to the tractor 10, and the mower will cut the grass on that side. Further forward movement of the tractor 10 will cause the arms 13 and 12 to pivot rearwardly, but the bumpers 31 will remain in contact with the object 32 as the cutter 16 moves in a circle around the object 32, according to the dot-dash lines designated 34. Finally, when the tractor 10 is at least substantially beyond the object 32, the cutter unit 16 will be moved forwardly, by virtue of the accumulators 22 and 28, and the cutter unit 16 will then follow the path designated by the portion of the curved dot-dash line at 36, and ultimately the cutter will follow the path of the straight dot-dash line at 37.

In this arrangement, the cutter 16 moves in a complete circle around the object 32, and there need be only one cutter unit or only one cutter blade 17. Further, the tractor 10 need not be steered so that the cutter unit 16 engages the post 32 in precisely the manner shown and described in connection with FIG. 1. That is, even the bumpers 31 on the arm 12 could be in line with and thus engage the object 32, and the cutter 16 would be ultimately swung to where it would move to the far side of the post or tree 32, such as indicated by the dot-dash lines at 33, and, ultimately, the cutter 16 would move in the circle around the object 32, just as indicated in FIG. 1. It will be further noted that the bumpers of buffers 31 are disposed above the mower housing 21 and they therefore do not interfere with the action of the cutter blade 17. Of course if the bumpers 31 were not used, then the blade 17 could come right up to the object 32 and would not even be spaced away from the object 32 to the distance shown by the overlap of the bumpers 31. However, the use of the bumpers 31 serve as protectors to both the object and the apparatus. Also, as mentioned, only one cutter unit 16 will serve to mow in the complete circle around the object 32, and the device is therefore efficient as well as lightweight and can be practically provided and supported in the nature shown, and it can be driven by only one remotely located power unit, such as the hydraulic or electric motor 18 or that may be a gasoline engine or other drive, and only flexible lines, such as the lines 19 are required to extend from the tractor 10, if that be the desired source of energy.

What is claimed is:

1. A mower for mowing around an object such as a tree or post, comprising a mobile support movable along the ground in a forward direction, a first arm pivotally mounted on said support and extending laterally therefrom, a second arm pivotally mounted on the extending end of said first arm and extending therefrom in a position forward and lateral of said first arm relative to the forward direction of movement of said mobile support, a cutter supported on the extending end of said second arm and being disposed thereon and extending forward of said second arm to be positionable on the far side of a tree or post or other object, relative to said mobile support, and being movable in a full circle around said object for mowing grass around said object, yieldable means for each of said arms for yieldingly urging said arms to their aforesaid respective positions while permitting pivoting of said arms in the rearward direction, relative to said mobile support, and in accordance with movement of said arms against the resistance of said object, said yieldable means for said first arm being connected between said mobile support and said first arm yieldable means, and drive means connected to said cutter for operating said cutter.

2. The mower as claimed in claim 1, wherein said cutter is a single cutter unit and with said second arm extending at 45 degrees relative to said first arm.

3. The mower as claimed in claim 1, including a stop engageable with each of said arms for limiting the pivotal position of said arms relative to the forward direction of movement of said mobile support.

4. The mower as claimed in claim 1, including bumper means on said cutter for contacting said object and preventing damage to said object and said mower.

5. The mower as claimed in claim 1, including bumper means on said cutter and on said first arm for contacting said object and preventing damage to said object and said mower.

* * * * *